(12) United States Patent
Räsänen et al.

(10) Patent No.: US 7,911,943 B2
(45) Date of Patent: Mar. 22, 2011

(54) OPTIMIZATION OF PDP CONTEXT USAGE

(75) Inventors: Juha Räsänen, Espoo (FI); Jorma Sarja, Espoo (FI)

(73) Assignee: Nokia Corporation, Espoo (FI)

( * ) Notice: Subject to any disclaimer, the term of this patent is extended or adjusted under 35 U.S.C. 154(b) by 420 days.

(21) Appl. No.: 11/649,227

(22) Filed: Jan. 4, 2007

(65) Prior Publication Data

US 2007/0165630 A1 Jul. 19, 2007

Related U.S. Application Data

(60) Provisional application No. 60/758,529, filed on Jan. 13, 2006.

(51) Int. Cl.
*H04J 1/02* (2006.01)
*H04L 12/28* (2006.01)
*H04L 12/26* (2006.01)

(52) U.S. Cl. .................... 370/229; 370/497

(58) Field of Classification Search .................... None
See application file for complete search history.

(56) References Cited

U.S. PATENT DOCUMENTS

| | | | | |
|---|---|---|---|---|
| 7,246,176 | B2* | 7/2007 | Mizell et al. | 709/245 |
| 7,298,697 | B2* | 11/2007 | Hurtta | 370/230 |
| 2002/0114305 | A1 | 8/2002 | Oyama et al. | |
| 2004/0028362 | A1* | 2/2004 | Otosaka et al. | 385/123 |
| 2004/0116117 | A1* | 6/2004 | Ahvonen et al. | 455/432.3 |
| 2004/0187021 | A1* | 9/2004 | Rasanen | 713/200 |
| 2004/0190453 | A1* | 9/2004 | Rasanen et al. | 370/235 |
| 2004/0218607 | A1* | 11/2004 | Hurtta et al. | 370/395.21 |
| 2004/0223489 | A1* | 11/2004 | Rotsten et al. | 370/352 |
| 2004/0228362 | A1* | 11/2004 | Maki et al. | 370/467 |
| 2005/0135389 | A1* | 6/2005 | Hurtta | 370/401 |
| 2005/0169208 | A1* | 8/2005 | Carrion-Rodrigo et al. | 370/328 |
| 2005/0210141 | A1 | 9/2005 | Oyama et al. | |

OTHER PUBLICATIONS

3GPP TS 23.207 V6.6.0 3rd Generation Partnership Project; Technical Specification Group Services and System Aspects; End-to-end Quality of Service (QOS) concept and architecture (Release 6), Sep. 2005, pp. 1-53.*

3GPP TR 23.882 V0.9.0, $3^{rd}$ Generation Partnership Project; Technical Specification Group Services and System Aspects; 3GPP System Architecture Evolution: Report on Technical Options and Conclusions (Release 7), Dec. 2005, pp. 1-71.

3GPP TS 23.228 V7.2.0, $3^{rd}$ Generation Partnership Project; Technical Specification Group Services and System Aspects; IP Multimedia Subsystem (IMS); Stage 2 (Release 7), Dec. 2005, pp. 1-192.

3GPP TS 23.207 V6.3.0, $3^{rd}$ Generation Partnership Project; Technical Specification Group Services and System Aspects; End-to-end Quality of Service (QoS) concept and architecture (Release 6), Jun. 2004, pp. 1-52.

(Continued)

*Primary Examiner* — Chirag G Shah
*Assistant Examiner* — Jenkey Van
(74) *Attorney, Agent, or Firm* — Alston & Bird LLP (57) ABSTRACT

In a mechanism for controlling a communication connection with policy control, after the communication connection with policy control is established in a communication network between a user equipment and service providing network element via a network control element on the basis of an initial packet data protocol context, a modification of the initial packet data protocol context for the communication connection is requested or initiated at the network control element. When the modification is authorized, relevant resources for a modified packet data protocol context usable for signalling traffic and transmission of media stream data are set up.

49 Claims, 6 Drawing Sheets

OTHER PUBLICATIONS

3GPP TS 23.228 V7.1.0, 3$^{rd}$ Generation Partnership Project; Technical Specification Group Services and System Aspects; IP Multimedia Subsystem (IMS); Stage 2 (Release 7), Sep. 2005, pp. 1-189.

3GPP TS 23.060 V5.0.0, 3$^{rd}$ Generation Partnership Project; Technical Specification Group Services and System Aspects; General Packet Radio Service (GPRS); Service description; Stage 2 (Release 5), Jan. 2002, pp. 1-198.

3GPP TS 27.060 V4.0.0, 3$^{rd}$ Generation Partnership Project; Technical Specification Group Core Network; Packet Domain; Mobile Station (MS) supporting Packet Switched Services (Release 4), Mar. 2001, pp. 1-27.

3GPP TS 29.060 V5.0.0, 3$^{rd}$ Generation Partnership Project; Technical Specification Group Core Network; General Packet Radio Service (GPRS); GPRS Tunnelling Protocol (GTP) across the Gn and Gp Interface (Release 4), Dec. 2001, pp. 1-93.

3GPP TS 24.008 V5.0.0, 3$^{rd}$ Generation Partnership Project; Technical Specification Group Core Network; Mobile radio interface layer 3 specification; Core Network Protocols-Stage 3 (Release 5), Jun. 2001, pp. 1-443.

3GPP TS 29.207 V6.5.0, 3$^{rd}$ Generation Partnership Project; Technical Specification Group Core Network and Terminals; Policy control over Go interface (Release 6), Sep. 2005, pp. 1-59.

3GPP TS 29.208 V6.6.0, 3$^{rd}$ Generation Partnership Project; Technical Specification Group Core Network and Terminals; End-to-end Quality of Service (QoS) signaling flows (Release 6), Dec. 2005, pp. 1-53.

3GPP TS 23.207 V6.6.0, 3$^{rd}$ Generation Partnership Project; Technical Specification Group Services and System Aspects; End-to-end Quality of Service (QoS) concept and architecture (Release 6), Sep. 2005, pp. 1-53.

3PoC: An Architecture for Enabling Push to Talk Services in 3GPP Networks, Swapnil Kumar Raktale, Hughes Software Systems, May 6, 2005, pp. 202-206.

3GPP TSG-SA WG2 Meeting #41, Montreal, Canada, Aug. 16-20, 2004, Tdoc S2-042844, Change Requests, pp. 1-4.

* cited by examiner

OPTIMIZATION OF PDP CONTEXT USAGE

CROSS-REFERENCE TO RELATED APPLICATIONS

This application claims priority of U.S. Provisional Patent Application No. 60/758,529, filed on Jan. 13, 2006. The subject matter of this earlier filed application is hereby incorporated by reference.

BACKGROUND OF THE INVENTION

1. Field of the Invention

The present invention relates to a mechanism usable for controlling a communication connection with policy control. In particular, the present invention relates to a method of controlling a communication connection with policy control, a corresponding system, a corresponding network control element, a corresponding user equipment and a corresponding computer program product which are usable for a optimizing the resource management, such as a number of active packet data protocol (PDP) contexts, for a communication connection, e.g. between a user equipment and a service providing network, such as a IP Multimedia Subsystem (IMS).

For the purpose of the present invention to be described herein below, it should be noted that

- a communication equipment or user equipment may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are particularly suitable for being used in connection with the present invention;
- although reference was made herein before to multimedia calls, this exemplifies only a specific example of content; content as used in the present invention is intended to mean also multimedia data of at least one of audio data, video data, image data, text data, and meta data descriptive of attributes of the audio, video, image and/or text data, any combination thereof or even, alternatively or additionally, other data such as, as a further example, program code of an application program to be accessed/downloaded;
- method steps likely to be implemented as software code portions and being run using a processor at one of the entities described herein below are software code independent and can be specified using any known or future developed programming language;
- method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices or means can be implemented as individual devices or means, but this does not exclude that they are implemented in a distributed fashion throughout the system, as long as the functionality of the device is preserved.

2. Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's communication equipment or user equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the communication equipment and is connected via an interface to a corresponding core or backbone network subsystem. The core (or backbone) network subsystem switches the data transmitted via the communication connection to a destination party, such as another communication equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the communication equipment (or subscriber terminal) and another communication equipment or terminal, a database, a server, etc., one or more intermediate network elements such as network control elements, support nodes or service nodes are involved. Network control elements, such as a Mobile Switching Center (MSC), Service GPRS Support Nodes (SGSN), Gateway GPRS Support Nodes (GGSN) or the like, are responsible for controlling the call establishment, call control, call termination, and the like.

Recently, one major goal in the field of telecommunication is to merge mobile communication networks and the Internet. As a key element for achieving this goal, the IP Multimedia Subsystem (IMS) has been developed that makes it possible to provide access for mobile communication network elements to the services provided by the Internet. Various specifications, for example by 3GPP, are dealing with the architecture and functionality of IMS which are generally known for those skilled in the art.

3GPP provides a mechanism for the network to authorize the establishment of media streams with the IMS. This mechanism is called service based local policy (SBLP) and is specified by 3GPP. In brief, different network entities, such as a GGSN and a Policy Decision Function (PDF), exchange information on authorization and resources for media streams to be established.

According to the current 3GPP specifications, an IMS user equipment using SBLP is required to have at least two active PDP contexts—one for the IMS signalling and one (or more) for the session related media streams. The PDP context used for signalling can be either a general purpose PDP context (i.e. unfiltered) or a signalling PDP context (i.e. filtered so that only IP packets between the UE and pre-defined signalling network elements are passed through, and possibly offering a better QoS). IP packet filters for the media stream PDP context are derived from SDP/SIP (session description protocol/ session initiation protocol) and defined by means of packet classifiers by the PDF.

Currently, 3GPP has started working on "3.9G" (3.9 generation), a.k.a. SAE (system architecture evolution) or LTE (long term evolution). The objective of this work is to develop a framework for an evolution or migration of the 3GPP system to a higher-data-rate, lower-latency, packet-optimized system that supports multiple Radio Access Technologies (RAT). Further details of this work are disclosed in the draft technical report 3GPP TR 23.882 V0.9.0. According to this, the basic IP connectivity ("PDP context") in the evolved architecture is established during the initial access phase of the UE to the network. One aim is that the number of signalling transactions shall be minimized for the set-up of IP connectivity with an enhanced Quality of Service (QoS). Regarding the QoS concepts, it is further specified that for the resource establishment and QoS signalling a preceding signalling of QoS requirements is assumed. This could be either by application signalling (e.g. IMS) or by IP bearer signalling. Moreover, the key issue on QoS concepts encompasses means for providing enhanced QoS for services that require QoS or policies beyond what the default IP access bearer provides.

For the IMS, it is specified, for example in 3GPP specification TS 23.228, V7.2.0, that the UE can use a single general purpose PDP context for both the signalling and the media streams of an IMS session. However, in such a case, there are no signalling filters nor SBLP based packet classifier filters provided, which means that the SBLP cannot actually be used and all traffic (including spam) may pass through. Alternatively, it is specified that the UE can use a general purpose PDP context for the signalling and a separate PDP context with SBLP based filters for the media streams of an IMS session. Thus, as mentioned before, there are two PDP contexts at the least. Furthermore, there are no signalling filters provided, i.e. all traffic (including spam) may pass through. As a further alternative, the UE can use a signalling PDP context for the signalling and a separate PDP context with SBLP, based filters for the media streams of an IMS session. Hence, again two PDP contexts at the least are required.

In a change request (CR) for the 3GPP specification TR23.207 V6.3.0 dated August 2004, it is proposed that the UE is enabled to activate/modify at least one non-realtime PDP Context on each Access Point Name (APN) (with UMTS traffic class background or interactive) without including a Media Authorization Token to a corresponding activation/ modification message. However, this proposal does not provide any details or suggestions regarding the problem how to apply filtering.

Therefore, according to the current specifications, for example by 3GPP, a UE communicating with the IMS by using SBLP has to have at least two active PDP contexts— one for the IMS signalling and one (or more) for the session related media streams. The PDP context used for signalling can be either a general purpose PDP context (i.e. unfiltered) or a signalling PDP context (i.e. filtered so that only IP packets between the UE and pre-defined signalling network elements are passed through, and possibly offering a better QoS).

SUMMARY OF THE INVENTION

Thus, it is an object of the invention to provide an improved mechanism for controlling a communication connection with policy control which is easy to implement and needs less resources for the communication connection.

This object is achieved by the measures defined in the attached claims.

In particular, according to one aspect of the proposed solution, there is provided, for example, a method of controlling a communication connection with policy control, the method comprising steps of establishing a communication connection with policy control in a communication network between a user equipment and service providing network element via a network control element on the basis of an initial packet data protocol context, requesting for a modification of the initial packet data protocol context for the communication connection at the network control element, checking whether or not the modification is authorized, and, if the modification is authorized, setting up relevant resources for a modified packet data protocol context usable for signalling traffic and transmission of media stream data, and responding to the request for modification with an acknowledgement or with a set of communication connection parameters resulting from the step of setting up the resources.

Furthermore, according to one aspect of the proposed solution, there is provided, for example, a system for controlling a communication connection with policy control, the system comprising a user equipment, a network control element, and a service providing network element, wherein the user equipment is configured to establish a communication connection with the service providing network element via the network control element on the basis of an initial packet data protocol context, and to request for a modification of the initial packet data protocol context for the communication connection at the network control element, and the network control element is configured to check whether or not the modification is authorized, and, if the modification is authorized, to set up relevant resources for a modified packet data protocol context usable for signalling traffic and transmission of media stream data, and to respond to the request for modification with an acknowledgement or with a set of communication connection parameters resulting from the set up of the resources.

In addition, according to one aspect of the proposed solution, there is provided, for example, a network control element usable for controlling a communication connection with policy control in a communication network, the network control element being configured to control an establishment of a communication connection with policy control between a user equipment and a service providing network element on the basis of an initial packet data protocol context, to receive a request for a modification of the initial packet data protocol context for the communication connection from the user equipment, to check whether or not the modification is authorized, and, if the modification is authorized, to set up relevant resources for a modified packet data protocol context usable for signalling traffic and transmission of media stream data, and to respond to the request for modification with an acknowledgement or with a set of communication connection parameters resulting from the set up of the resources.

Moreover, according to one aspect of the proposed solution, there is provided, for example, a user equipment configured to establish a communication connection with policy control, the user equipment being configured to establish a communication connection with a service providing network element via a network control element on the basis of an initial packet data protocol context, to request for a modification of the initial packet data protocol context for the communication connection at the network control element for a modified packet data protocol context usable for signalling traffic and transmission of media stream data, to receive, in response to the request for the modification an acknowledgement or a set of communication connection parameters for the modified packet data protocol context usable for signalling traffic and transmission of media stream data, the set of communication connection parameters resulting from a set up of relevant resources executed due to the request for the modification.

In addition, according to one aspect of the proposed solution, there is provided, for example, a computer program product for a computer, comprising software code portions for making, when said product is run on the computer, said computer to function as a control element usable for controlling a communication connection with policy control, wherein the computer program product is configured to execute steps of controlling an establishment of a communication connection with policy control in a communication network between a user equipment and service providing network element on the basis of an initial packet data protocol context, receiving a request for a modification of the initial packet data protocol context for the communication connection, checking whether or not the modification is authorized, and, if the modification is authorized, setting up relevant resources for a modified packet data protocol context usable for signalling traffic and transmission of media stream data, and responding to the request for modification with an acknowledgement or with a set of communication connection parameters resulting from setting up the resources.

Alternatively, according to one aspect of the proposed solution, there is provided, for example, a method of controlling a communication connection with policy control, the method comprising steps of establishing a communication connection with policy control in a communication network between a user equipment and service providing network element via a network control element on the basis of an initial packet data protocol context, receiving a pushed authorization for a modification of the initial packet data protocol context for the communication connection at the network control element, initializing the modification of the initial packet data protocol context for the communication connection at the network control element, informing the user equipment about the modification by forwarding a request for modification of the initial packet data protocol context for the communication connection, and setting up relevant resources for a modified packet data protocol context usable for signalling traffic and transmission of media stream data.

Furthermore, according to one aspect of the proposed solution, there is provided, for example, a network control element usable for controlling a communication connection with policy control in a communication network, the network control element being configured to control an establishment of a communication connection with policy control between a user equipment and a service providing network element on the basis of an initial packet data protocol context, to receive a pushed authorization for a modification of the initial packet data protocol context for the communication connection at the network control element, to initialize the modification of the initial packet data protocol context for the communication connection at the network control element, to inform the user equipment about the modification by forwarding a request for modification of the initial packet data protocol context for the communication connection, and to set up relevant resources for a modified packet data protocol context usable for signalling traffic and transmission of media stream data.

According to further refinements, the proposed solution may comprise one or more of the following features:

- the check of the authorization of the modification may be executed by requesting an authorization from a policy decision function and/or a policy and charging rules function;
- the relevant resources to be set up may comprise at least one of a Quality of Service class of the packet data protocol context, filters to be used for the communication connection and bandwidth settings to be reserved for the communication connection;
- the response to the request for modification may comprise a transmission of information on Quality of Service parameters;
- the initial packet data protocol context may be a basic IP connectivity or general purpose packet data protocol context. Then the request for a modification of the initial packet data protocol context for the communication connection may comprise a relevant IP connectivity/packet data protocol context modification request to a user plane entity associated with the network control element. Optionally, the request for a modification of the initial packet data protocol context for the communication connection may comprise a step of sending a set of binding information in the modification request to the network control element. In these cases, the set up of the relevant resources for a modified packet data protocol context usable for signalling traffic and transmission of media stream data may comprise a generation of a filtered packet data protocol context by setting up signalling filters for the packet data protocol context as well as setting up packet classifier filters for a media stream to be transmitted via the communication connection, the set up of a Quality of Service class of the packet data protocol context to the highest value required by any of the media streams and/or network elements (i.e. components like the user equipment and an IMS server involved in the communication connection) using the packet data protocol context; and the reservation of traffic resources for the communication connection to an amount that the requirements for signalling traffic and media streams are fulfilled. The traffic resources may comprise a bandwidth for the communication connection;
- the initial packet data protocol context may be a signalling packet data protocol context. Then, the request for a modification of the initial packet data protocol context for the communication connection may optionally comprise a set of binding information in the modification request to the network control element. In this case, the set up of relevant resources for a modified packet data protocol context usable for signalling traffic and transmission of media stream data may comprise a set up of packet classifier filters for a media stream to be transmitted via the communication connection in parallel to signalling filters existing for the initial signalling packet data protocol context, the set up of a Quality of Service class of the packet data protocol context to the highest value required by any of the media streams and/or network elements (i.e. components like the user equipment and an IMS server involved in the communication connection) using the packet data protocol context, and the reservation of traffic resources for the communication connection to an amount that the requirements for signalling traffic and media streams are fulfilled. The traffic resources may comprise a bandwidth for the communication connection;

the network control element may comprise a gateway general packet radio service support node;

the service providing network element may be comprised in an IP Multimedia Subsystem environment.

By virtue of the proposed solutions, the following advantages can be achieved. While according to the prior art an IMS session with policy control or using local policy settings by means of SBLP requires at least two active PDP contexts, the present invention enables an IMS session having SBLP functionality with only one active PDP context. Hence, the usage of resources for the communication connection is optimized since the number of active PDP contexts is decreased. In other words, it is not necessary to provide separate signalling PDP contexts for IMS sessions using SBLP. This means a simpler implementation and operation as well as resource savings at the IMS UE. Furthermore, support for a secondary PDP context is not required. Due to the fact that a decreased number of PDP contexts is to be maintained there is provided also resource saving at the network control element side, like the GGSN. In addition, by means of the present invention, it is possible to modify a general purpose or signalling context into a policy controlled context. Further, in a multi-access environment like xDSL access to IMS ("Next generation networks, NGN" being specified by a number of standardization organizations, e.g. 3GPP, ETSI and ITU-T) or WLAN access to IMS, an intersystem handover is made simpler, if a single PDP context is used. There is no need to adapt the multiple PDP context connectivity to/from the single context/single transmission pipe of xDSL access or WLAN access. Similar policy control concepts can be used for all accesses.

The above and still further objects, features and advantages of the invention will become more apparent upon referring to the description and the accompanying drawings.

DESCRIPTION OF PREFERRED EMBODIMENTS

In the following, embodiments of the present invention are described with reference to the drawings. For illustrating the present invention, the preferred embodiments will be described in a 3G network environment comprising mobile access network subsystem and core network subsystem components according to the 3GPP specifications, as well as in a IMS network environment and in a so called evolved system network environment designed according to 3.9G specifications. However, it is to be noted that the present invention is not limited to an application in such network environments but is also generally applicable in other network types.

Figure 1:
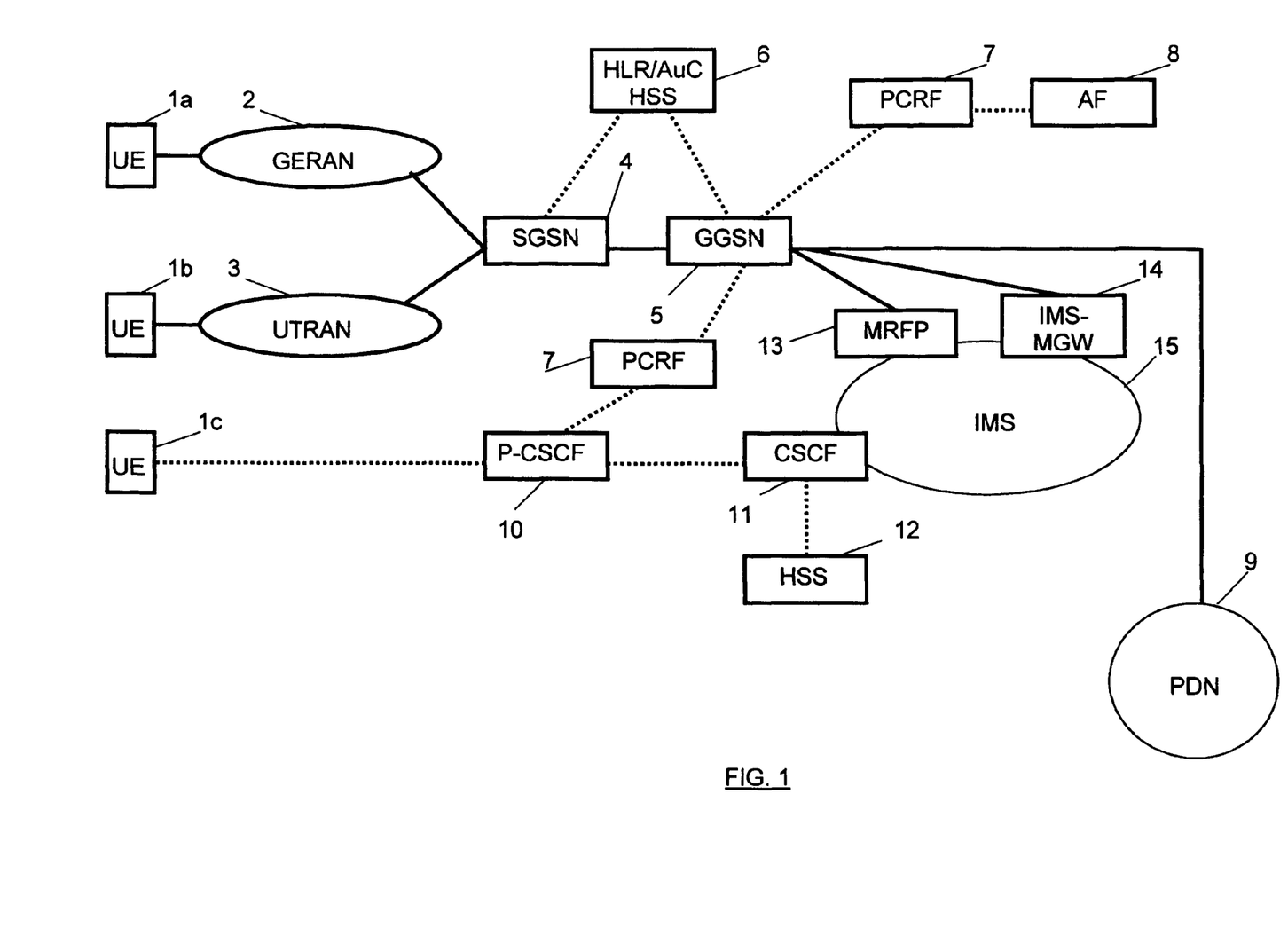
FIG. 1 shows a baseline architecture of a communication network in which the present invention is applicable.

In FIG. 1, a schematic block diagram of a baseline network architecture of a communication network is shown for improving the understanding of the invention. It is to be noted that the structure according to FIG. 1 represents only a simplified example of the architecture of the communication network environment in which the present invention is applicable. As known by those skilled in the art, there are provided several additional network elements and signaling links used for a communication connection. However, for the sake of simplicity, only those elements are depicted which are necessary for describing the invention.

Furthermore, the network elements and their functions described herein may be implemented by software, e.g. by a computer program product for a computer, or by hardware. In any case, for executing their respective functions, correspondingly used devices, such as a user equipment (UE), core network control element like a GGSN and associated functions, an access network subsystem element like Radio Access Network RAN element and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like. Similar to that, the IMS domain may comprise several elements and/or functionalities not shown which are known, however, to a person skilled in the art and therefore not described in greater detail herein.

In FIG. 1, reference signs 1a, 1b, 1c denote respective user equipments which are usable to establish a communication connection being controlled according to the present invention, for example an IMS connection for media streams or the like. It is to be noted that the UE 1a, 1b and 1c may be one and the same user equipment connectable to the network via different access networks. The links between respective network elements in FIG. 1 are to be discriminated into traffic and signalling links (solid lines) and signalling links (dotted lines).

Reference sign 2 denotes a GSM (Global Systems for Mobile Communication) EDGE (Enhanced Data rates for GSM Evolution) Radio Access Network (GERAN) which comprises access network elements like transceiver stations for a communication to/from the UE 1a from/to the communication network. Similarly, reference sign 3 denotes a UMTS Terrestrial Radio Access Network (UTRAN) which comprises access network elements like transceiver stations for a communication to/from the UE 1b from/to the communication network. The GERAN 2 and the UTRAN 3 represent only examples for access networks via which a user equipment can get access to the communication network, and there exists also further access network technologies, such as Wireless Local Area Networks (WLAN) or the like which are known to those skilled in the art as being equivalently usable.

Via the GERAN 2 and the UTRAN 3, the user equipment is connected to a packet switched core network comprising network control elements for controlling communication connections of the UE 1*a*, 1*b*. These core network elements comprise, for example, a SGSN 4 and a GGSN 5. The GGSN 5 provides a connection to a Public Data Network (PDN) 9 like the Internet.

Furthermore, there is provided a Home Location Register/ Authentication Centre and Home Subscriber Server (HLR/ AuC HSS) 6. This network element 6 is used as database for subscriber information, authentication information, and the like, to be retrieved by the core network elements for the establishment and control of a communication connection.

Reference sign 7 denotes a Policy and Charging Rules Function (PCRF) being connected to the GGSN 5. The PCRF 7 encompasses policy control decision and flow based charging control functionalities, and provides network control regarding the QoS and flow based charging towards the gateway element. Reference sign 8 denotes an Application Function (AF). The AF 8 is an element offering applications that require the control of IP bearer resources and is capable of communicating with the PCRF 7 to transfer dynamic service information, which can then be used for selecting the appropriate charging rule and service based local policy by the PCRF 7. One example of an AF is a P-CSCF (e.g. P-CSCF 10) of IM core network subsystem.

Reference sign 13 denotes a Multimedia Resource Function Processor (MRFP) and reference sign 14 denotes a IMS Media Gateway (IMS-MGW). These elements 13 and 14 are used for supporting media streams by establishing suitable IP bearers and the like.

Reference sign 15 denotes the IMS network environment offering IMS services. The communication connection established by the UE 1*a*, 1*b* is directed to the IMS 15.

Moreover, in FIG. 1, the user equipment denoted by reference sign 1*c* is connected via a Proxy-Call Session Control Function (P-CSCF) 10 to a Call Session Control Function (CSCF) 11. The CSCF 10 provides session control for subscribers accessing services within the IMS 15 and is interacting with network databases, such as a HSS 12 or a (not shown) Access, Authorization and Accounting (AAA) Server, for mobility and security. It is to be noted that the network elements 6 and 12, even though shown as separate entities, may belong to the same logical entity.

The general operation of and interworking between the network elements shown in FIG. 1 are commonly known for persons skilled in the art and this not described herein in further detail. The specific functions according to the present invention will be described below.

Figure 2:
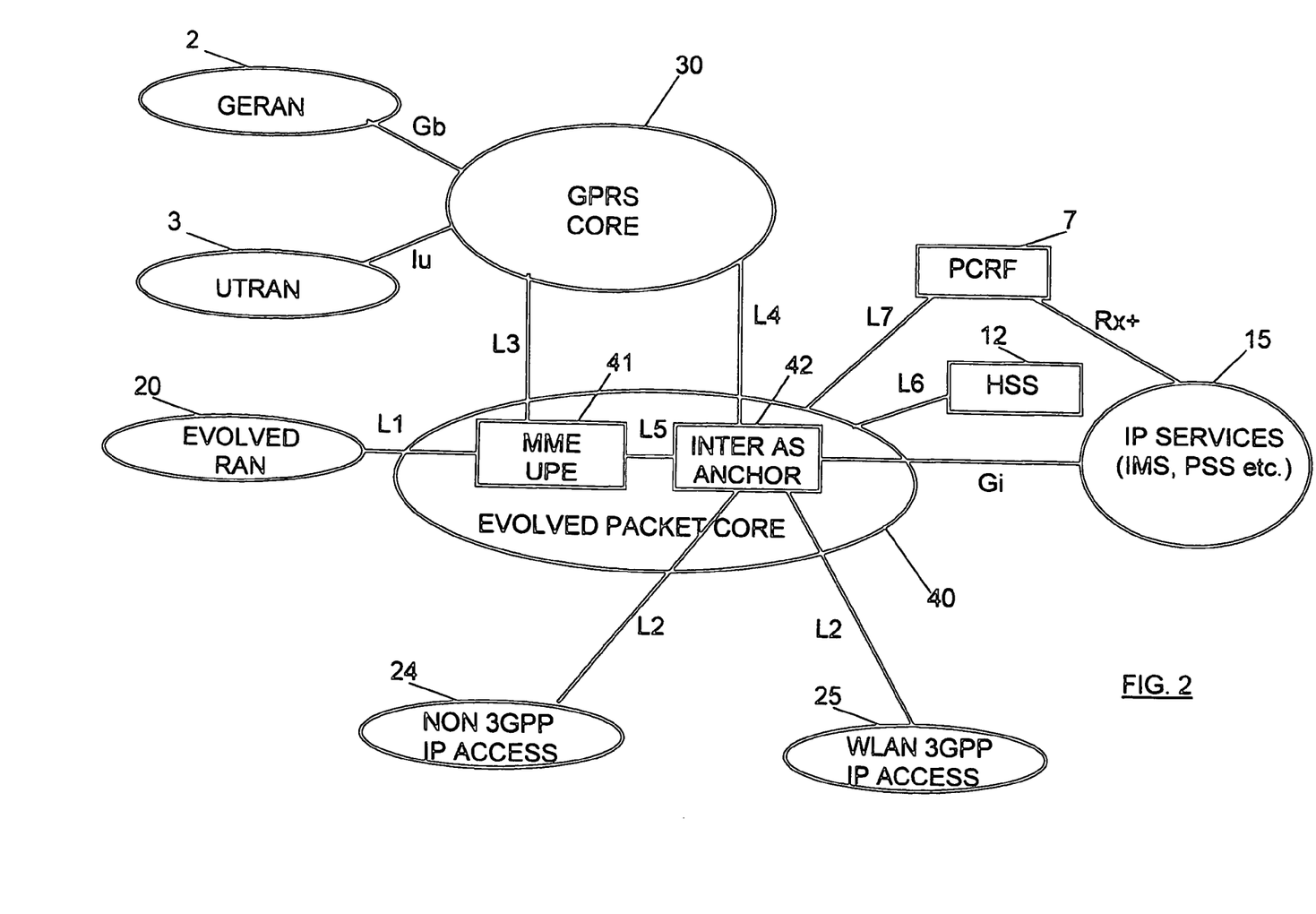
FIG. 2 shows a simplified example of an evolved system based on the architecture shown in FIG. 1.

In FIG. 2, a simplified example of an evolved system based on the architecture shown in FIG. 1 is depicted, wherein same reference signs are used for equivalent components in the FIGS. 1 and 2. The evolved system is based on considerations made in connection with the long term evolution of 3GPP access technology (also known as 3.9G) and specified, for example, in the above mentioned 3GPP specification draft TR23.882 V0.9.0.

It is to be noted that the example shown in FIG. 2 represents only one alternative for an architecture of an evolved system. There are also other structures possible. In the following, for illustrating the implementation of the present invention, the example according to FIG. 2 is used, but the invention is also applicable to other architecture types of an evolved system.

In FIG. 2, reference signs 2 and 3 denote a GERAN and UTRAN access network, respectively. The GERAN 2 and UTRAN 3 are connected to a GPRS core network 30 which comprises, for example, network control elements SGSN and GGSN (not shown), and the like.

Reference sign 20 denotes an evolved Radio Access Network (Evolved RAN) usable by a communication equipment as an access to the evolved system. Reference sign 40 denotes an evolved packet core network which comprises, amongst other elements (not shown), a Mobility Management Entity (MME)/User Plane Entity (UPE) 41. In this entity 41, the MME part manages and stores UE context (for idle state: UE/user identities, UE mobility state, user security parameters) and generates temporary identities and allocates them to UEs. Furthermore, it checks the authorization whether the UE may camp on the access or on the Public Land Mobile Network (PLMN) and authenticates the user. The UPE part terminates for idle state UEs the downlink data path and triggers/initiates paging when downlink data arrive for the UE. It manages and stores UE contexts, e.g. parameters of the IP bearer service or network internal routing information. Furthermore, it performs replication of the user traffic in case of interception. It is to be noted that even though the MME and UPE part are shown in one entity, they may also be split into two separate elements.

The evolved packet core network 40 further comprises an Inter Access System Anchor (Inter AS Anchor) 42 which is the user plane anchor for mobility between different access systems and performs or supports handover between different access systems. Connected to the Inter AS Anchor 42, there are shown a non-3GPP IP Access 24, e.g. xDSL access, and a WLAN 3GPP IP Access 25 as examples for such different access systems.

Reference sign 7 denotes a PCRF and reference sign 12 denotes a HSS. Furthermore, denoted by reference sign 15, IP services, like the IMS or a packet switched streaming service (PSS), are provided.

The links between the elements shown in FIG. 2 are as follows. Between the GERAN 2 and the GPRS Core 30 a known Gb interface is used. Between the UTRAN 3 and the GPRS Core 30 a known Iu interface is used. Between the PCRF 7 and the Optional IP services 15, for example, a known Rx+ interface is used. Between the Inter AS Anchor 42 and the Optional IP services 15, for example, a known Gi interface is used. A link L1 between the evolved RAN 20 and the MME UPE 41 in the evolved packet core 40 provides access to Evolved RAN radio resources for the transport of user plane and control plane traffic. A link L2 between the Inter AS Anchor 42 in the evolved packet core 40 and the IP access systems 24, 25 provides the user plane with related control and mobility support between WLAN 3GPP IP access or non 3GPP IP access and Inter AS Anchor. A link L3 between the GPRS core 30 and the MME UPE 41 in the evolved packet core 40 enables user and bearer information exchange for inter 3GPP access system mobility in idle and/or active state. A link L4 between the GPRS core 30 and the Inter AS Anchor 42 in the evolved packet core 40 provides the user plane with related control and mobility support. A link L5 between the MME UPE 41 and the Inter AS Anchor 42 in the evolved packet core 40 provides the user plane with related control and mobility support between MME/UPE and Inter AS Anchor. It is to be noted that the MME/UPE and Inter AS Anchor may also be comprised in one entity wherein in such a case the link L5 is omitted. A link L6 between the evolved packet core 40 and the HSS 12 enables transfer of subscription and authentication data for authenticating/authorizing user access to the evolved system (i.e. provides an AAA interface). A link L7 between the evolved packet core 40 and the PCRF 7 provides transfer of (QoS) policy and charging rules from the PCRF to a Policy and Charging Enforcement Point (PCEP) (not shown). The PCEP may be provided, for example, in the Inter AS Anchor 42, or may be an individual PCEP per access system.

Figure 3:
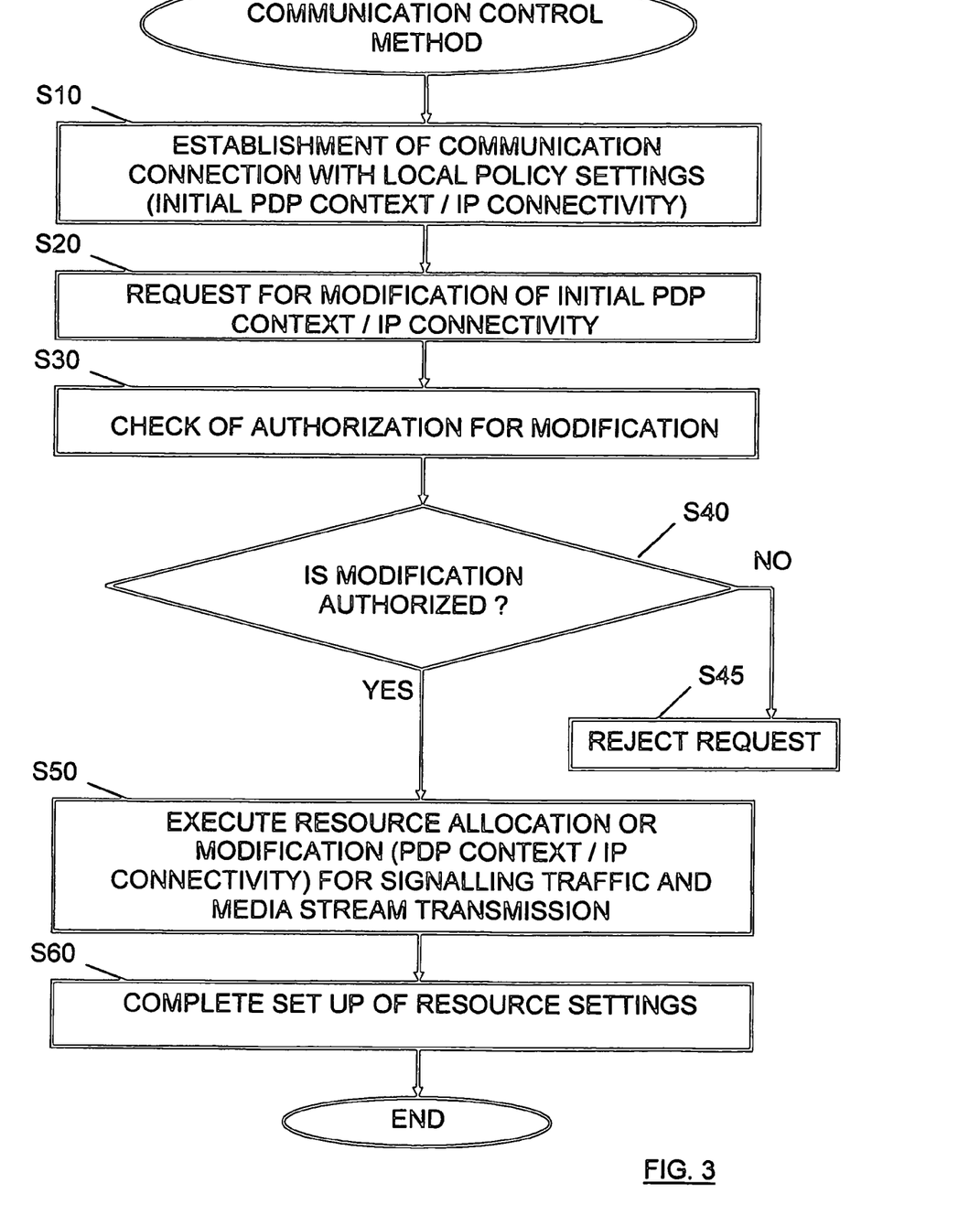
FIG. 3 shows a flow chart for illustrating the general communication connection control according to the present invention.

In FIG. 3, a flow chart for explaining the basic principle of the communication connection control mechanism according to the present invention is shown.

In the communication connection control mechanism of the present invention, first, a communication connection with policy control between a first party, for example, a user equipment, and a second party, for example, a service providing network element or server, e.g. an IMS server, is established (step S10), wherein the communication connection is, for example, an IMS session using session based local policy (SBLP). The communication connection is initialized by activating an initial (general purpose) PDP context or a basic IP connectivity, for example. In step S20, when the first session is set up, the UE requests for a modification of the initial PDP context (or IP connectivity) for the communication connection. The reason for the modification of the context is to achieve a better quality for media streams, since a general purpose PDP context or a signalling PDP context, which a the initial PDP contexts activated for the communication connection, are not real time contexts, for example. This request is sent to the network control element of the core network controlling the communication connection, for example the GGSN of the GPRS core or the MME UPE of the evolved packet core (see FIG. 2). In the core network, it is checked in step S30 whether or not the modification is authorized. This is executed, for example, by a corresponding communication between the core network control element and policy control element, such as a PDF/PCRF, wherein the modification parameters sent from the UE in the request are transmitted to the PCRF and the transmitted modification parameters are compared in the PDF/PCRF with service information of the requesting UE (the service information is retrieved, for example, from the HSS, or is taken from the session establishment signalling, e.g. SDP/SIP). If the requested modification is not acceptable (i.e. the UE is not entitled for the modification) in step S40, the modification is rejected (step S45). On the other hand, if in step S40 the modification is authorized, an authorization response is transmitted from the PDF/PCRF to the core network control element. Then, in step S50, the core network performs a set up of relevant resources for a modified packet data protocol context (or IP connectivity) on the basis of the initial PDP context. This means that the IP connectivity resources are allocated to the communication connection in correspondence to the modification request, i.e. the PDP context to be used for the communication connection is modified such that the PDP contact passes signalling traffic and media stream data. Then, in step S60, the requested UE is informed about the allocated resources, i.e. the modified PDP context settings are transmitted to the UE. Alternatively, an acknowledgement for the modification is transmitted. Thus, the set up of the (modified) PDP context is completed.

The details of the communication control mechanism described above, in particular with regard to the modifications to be executed with regard to the PDP context/IP connectivity settings on the basis of the initial PDP context used, are described below in connection with different embodiments of the present invention.

Figure 4:
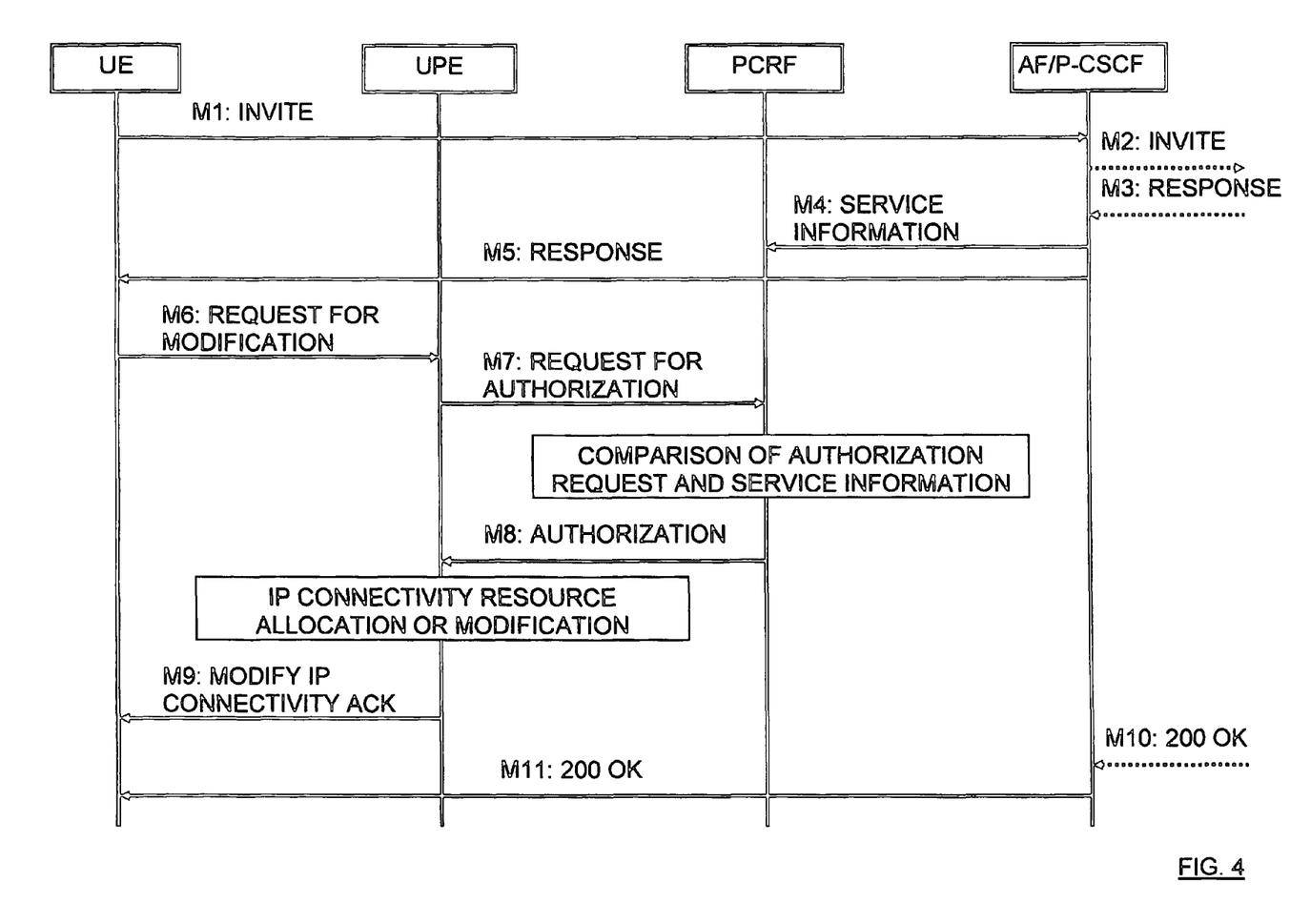
FIG. 4 shows a signalling diagram for illustrating a first embodiment of the communication connection control mechanism according to the present invention.

In a first embodiment illustrated in a signaling diagram according to FIG. 4, the communication connection is initially based on a common IP connectivity, also known as (general purpose) PDP context. Furthermore, according to the first embodiment, the communication connection is controlled by an evolved packet core, i.e. by a user plane entity UPE.

At the beginning, the UE establishes a communication connection to IMS by activating the "basic IP connectivity" or "PDP context", as described, for example, in the 3GPP specification draft TR 23.882 V0.9.0. The initial IP connectivity or PDP context may be established after the UE attaches the network, i.e. the context is "always on" before any session establishment is started. It is to be noted that this establishment of the initial IP connectivity or PDP context is very simplified illustrated, but a person skilled in the art is aware about the respective details so that a further description thereof is omitted herein.

When the initial PDP context is established, the UE starts to set up the (first) IMS session with SBLP. This is executed by sending an INVITE message M1 via the network to an application function AF or P-CSCF which forwards this INVITE message to a corresponding destination (message M2). From this destination, the AF/P-CSCF receives a RESPONSE message M3 and forwards this to the requesting UE with message M5. Furthermore, the AF/P-CSCF sends service information with message M4 to the PCRF for using them in authentication and authorization processing. The UE requests for a modification of the existing basic IP connectivity by sending a relevant connectivity/PDP context modification request to the network, i.e. to the control element UPE (message M6).

The network element UPE accepts the modification request received with message M6 for handling and requests for an authorization from the PDF/PCRF (message M7). The PDF/PCRF checks whether the modification is allowable, for example by comparing of the information included in the authorization request with the service information received from the AF/P-CSCF beforehand. Then, if the modification request is acceptable, the PDF/PCRF sends an authorization for the modification to the network element UPE with message M8.

After receiving the authorization from the PDF/PCRF, the UPE sets up the relevant resources, e.g. filters, QoS class and bandwidth, i.e. the UPE performs an IP connectivity resource allocation or modification. Especially, the network element UPE executes the following steps:

1.) it turns the (initial) general purpose PDP context to a filtered PDP context by setting up signalling filters for the PDP context, and by setting up Packet Classifier filters for the media streams of the IMS session parallel to the signalling filters. This means that the (resulting) PDP context will pass through both media stream packets matching the Packet Classifier filters and signalling packets matching the signalling filters;

2.) it sets the QoS class of the PDP context to the maximum of {QoS class of the signalling PDP context, QoS class requested for the user plane of the session}. This means that the QoS class is set to the highest value required by any of the media streams and/or network elements (i.e. components like the user equipment and an IMS server involved in the communication connection) using the PDP context; and 3.) it reserves resources, e.g. bandwidth (i.e. sets the maximum and authorized bit rates) in the PDP context wherein it is taken into account that both the media streams of the session and the signalling traffic are to be passed.

When the allocation/modification of the IP connectivity resources in the UPE is completed, the UE is informed about the settings by message M9 in which the request for modification by the UE (message M6) is responded by a modification instruction. In other words, the network element UPE responds to the IP connectivity/PDP context modification request by the UE with the relevant QoS parameters or simply acknowledges the request sent by the UE. Then, the UE completes the set up of the PDP context correspondingly.

Messages M10 (200 OK) to the AF/P-CSCF and M11 (200 OK) from AF/P-CSCF to the UE indicate the completion of the establishment of the communication connection (establishment of IMS session), i.e. the called party (B party) is answering to the call.

As a modification of the above described first embodiment, the network element (UPE) may initiate the modification of the existing basic IP connectivity. In this case, the UPE sends a relevant connectivity/PDP context modification request to the UE after receiving "a pushed authorization" from the PDF/PCRF.

Figure 5:
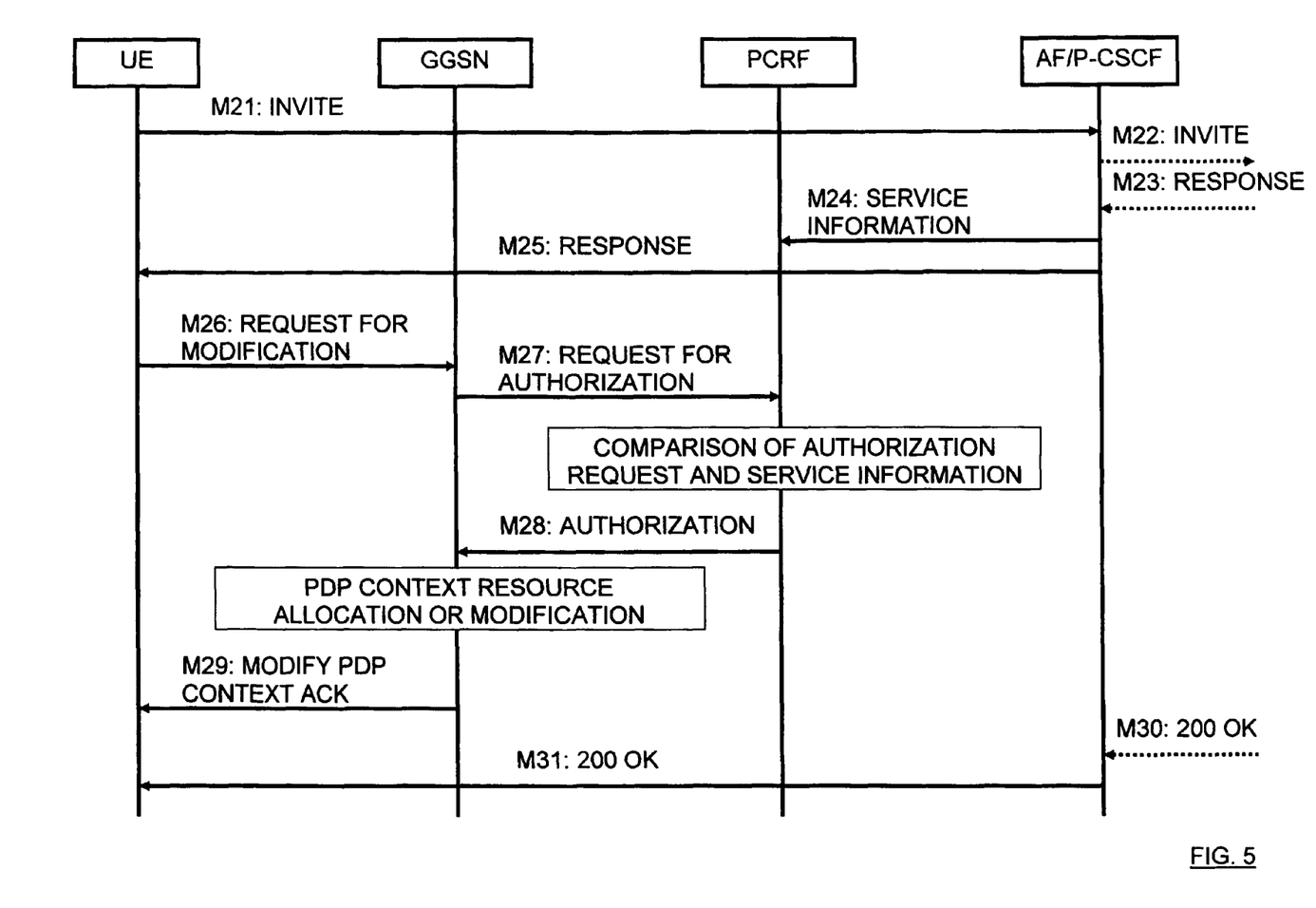
FIG. 5 shows a signalling diagram for illustrating a second embodiment of the communication connection control mechanism according to the present invention.

In a second embodiment illustrated in a signaling diagram according to FIG. 5, the communication connection is initially based on a signalling PDP context. Furthermore, according to the second embodiment, the communication connection is controlled by the GPRS core, i.e. by the GGSN.

At the beginning, the UE establishes a communication connection to IMS by activating the signalling PDP context, as described, for example, in the 3GPP specification TS 23.228 v.7.1.0.

When setting up the (first) IMS session with SBLP, the steps necessary for this establishment (i.e. messages M21 to M25) are similar to those of the first embodiment (i.e. messages M1 to M5). The UE requests for a modification of the existing signalling PDP context (message M26) by sending a modification request to the GGSN. As an option, depending on the network environment and requirements thereof, the modification request may comprise a set of Binding Information. The Binding Information may comprise, for example, user or user equipment identity and filters and bind the media streams between the control plane and the user plane. It is to be noted that conventionally according to present specifications, this would result in an activation of a new additional PDP context for the IMS session.

The GGSN accepts the modification request for handling and requests for an authorization at the PDF/PCRF (message M27). The PDF/PCRF checks whether the modification is allowable, for example by comparing of the information included in the authorization request with the service information received from the AF/P-CSCF beforehand. Then, if the modification request is acceptable, the PDF/PCRF sends an authorization for the modification to the GGSN with message M28.

After receiving the authorization from the PDF/PCRF, the GGSN sets up the relevant resources, e.g. filters, QoS class and bandwidth. Especially the GGSN executes the following steps:

1.) it sets up Packet Classifier filters for the media streams of the IMS session parallel to the signalling filters already existing for the (initial) PDP context. This means that the (resulting) PDP context will pass through both media stream packets matching the Packet Classifier filters and signalling packets matching the signalling filters;
2.) it sets the QoS class of the PDP context to the maximum of {QoS class of the signalling PDP context, QoS class requested for the user plane of the session}. This means that the QoS class is set to the highest value required by any of the media streams and/or network elements (i.e. components like the user equipment and an IMS server involved in the communication connection) using the packet data protocol context; and
3.) it reserves bandwidth (i.e. sets the maximum and authorized bit rates) in the PDP context taking into account that both the media streams of the session and the signalling traffic will be passed.

When the allocation/modification of the PDP context resources in the GGSN is completed, the UE is informed about the settings by message M29 in which the request for modification by the UE (message M26) is responded by a modification instruction. In other words, the network element GGSN responds to the PDP context modification request by the UE with the relevant QoS parameters or simply acknowledges the request sent by the UE. Then, the UE completes the set up of the PDP context correspondingly.

Messages M30 (200 OK) to the AF/P-CSCF and M31 (200 OK) from AF/P-CSCF to the UE correspond to messages M10 and M11 according to FIG. 4.

Similar to the first embodiment, as a modification of the above described second embodiment, the network element (GGSN) may initiate the modification of the existing signalling PDP context. In this case, the GGSN sends a PDP context modification request to the UE after receiving "a pushed authorization" from the PDF/PCRF.

Figure 6:
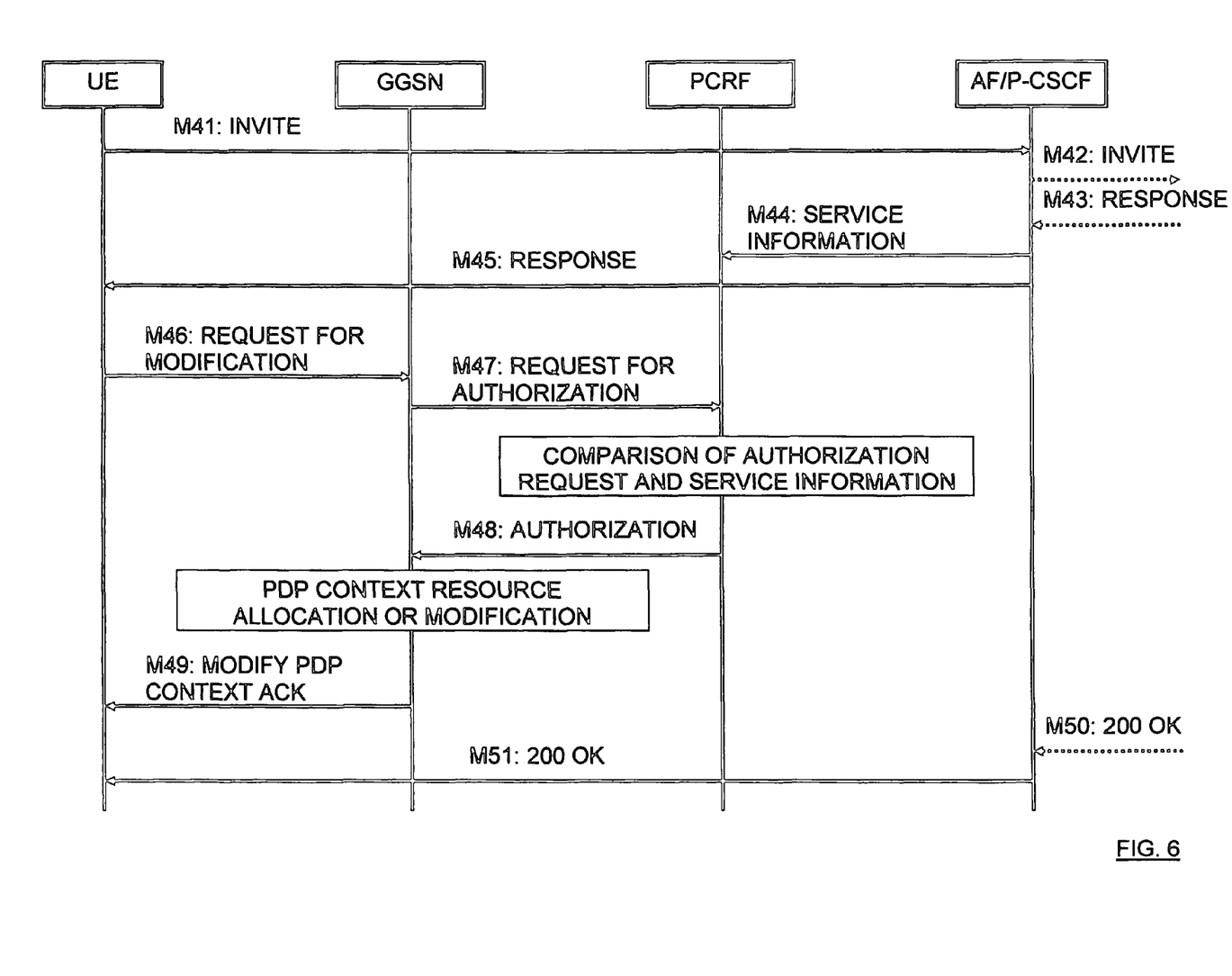
FIG. 6 shows a signalling diagram for illustrating a third embodiment of the communication connection control mechanism according to the present invention.

In a third embodiment illustrated in a signaling diagram according to FIG. 6, the communication connection is initially based on a general purpose PDP context. Furthermore, according to the third embodiment, the communication connection is controlled by the GPRS core, i.e. by the GGSN.

At the beginning, the UE establishes a communication connection to IMS by activating the general purpose PDP context, as described, for example, in the 3GPP specification TS 23.228 v.7.1.0.

When setting up the (first) IMS session with SBLP, the steps necessary for this establishment (i.e. messages M41 to M45) are similar to those of the first embodiment (i.e. messages M1 to M5). The UE requests for a modification of the existing general purpose PDP context (message M46) by sending a modification request to the GGSN. As an option, depending on the network environment and requirements thereof, the modification request may comprise a set of Binding Information. The Binding Information may comprise, for example, user or user equipment identity and filters and bind the media streams between the control plane and the user plane. It is to be noted that conventionally according to present specifications, this would result in an activation of a new additional PDP context for the IMS session.

The GGSN accepts the modification request for handling and requests for an authorization at the PDF/PCRF (message M47). The PDF/PCRF checks whether the modification is allowable, for example by comparing of the information included in the authorization request with the service information received from the AF/P-CSCF beforehand. Then, if the modification request is acceptable, the PDF/PCRF sends an authorization for the modification to the GGSN with message M48.

After receiving the authorization from the PDF/PCRF, the GGSN sets up the relevant resources, e.g. filters, QoS class and bandwidth. Especially the GGSN executes the following steps:

1.) turns the general purpose PDP context to a filtered PDP context by setting up signalling filters for the PDP context, and by setting up Packet Classifier filters for the media streams of the session parallel to the signalling filters. This means that the (resulting) PDP context will pass through both media stream packets matching the Packet Classifier filters and signalling packets matching the signalling filters;
2.) it sets the QoS class of the PDP context to the maximum of {QoS class of the signalling PDP context, QoS class requested for the user plane of the session}. This means that the QoS class is set to the highest value required by any of the media streams and/or network elements (i.e.

components like the user equipment and an IMS server involved in the communication connection) using the packet data protocol context; and 3.) it reserves bandwidth (i.e. sets the maximum and authorized bit rates) in the PDP context taking into account both the media streams of the session and the signalling traffic.

When the allocation/modification of the PDP context resources in the GGSN is completed, the UE is informed about the settings by message M49 in which the request for modification by the UE (message M46) is responded by a modification instruction. In other words, the network element GGSN responds to the PDP context modification request by the UE with the relevant QoS parameters or simply acknowledges the request sent by the UE. Then, the UE completes the set up of the PDP context correspondingly.

Messages M30 (200 OK) to the AF/P-CSCF and M31 (200 OK) from AF/P-CSCF to the UE correspond to messages M10 and M11 according to FIG. 4.

Similar to the first and second embodiments, as a modification of the above described third embodiment, the network element (GGSN) may initiate the modification of the existing general purpose PDP context. In this case, the GGSN sends a PDP context modification request to the UE after receiving "a pushed authorization" from the PDF/PCRF.

In all of the above described embodiments, the UE has to take into account that it can use the same PDP context for both signalling and media streams of the relevant policy controlled session(s). Furthermore, In the second embodiment, the GGSN is adapted to allow the modification of a signalling PDP context to a hybrid PDP context with parallel signalling filters and Packet Classifier filters and reserve resources accordingly. On the other hand, in the first and third embodiments, the UPE or the GGSN is adapted to allow the modification of a basic IP connectivity or a general purpose PDP context to a hybrid IP connectivity or PDP context with parallel signalling filters and Packet Classifier filters and reserve resources accordingly.

According to the present invention, it is possible to modify a general purpose or signalling PDP context or the like into a policy controlled (PDP) context. Furthermore, there are required no separate signalling PDP contexts for IMS sessions using SBLP so that a simpler implementation and operation are possible as well as resource savings at the IMS UE can be achieved since no support for a secondary PDP context is required. Resource savings are also achieved at the GGSN due to less PDP contexts to maintain. Further, in a multi-access environment like xDSL or WLAN access to IMS, an intersystem handover is made simpler, because there is no need to adapt the multiple PDP context connectivity to/from the single context/single transmission pipe xDSL access or WLAN access, and because similar policy control concepts can be used for all accesses.

As described above, in a mechanism for controlling a communication connection with policy control, after the communication connection with policy control is established in a communication network between a user equipment and service providing network element via a network control element on the basis of an initial packet data protocol context, a modification of the initial packet data protocol context for the communication connection is requested or initiated at the network control element. When the modification is authorized, relevant resources for a modified packet data protocol context usable for signalling traffic and transmission of media stream data are set up.

It should be understood that the above description and accompanying figures are merely intended to illustrate the present invention by way of example only. The preferred embodiments of the present invention may thus vary within the scope of the attached claims.

The invention claimed is:

1. A method comprising:
   causing establishment of a communication connection with a policy control in a communication network between a user equipment and service providing network element via a network control element based on an initial packet data protocol context, wherein the initial packet data protocol context comprises a signaling packet data protocol context;
   causing receipt of a request for a modification of the initial packet data protocol context for the communication connection at the network control element;
   checking whether or not the modification is authorized; and
   in an instance in which the modification is authorized,
   setting up relevant resources for a modified packet data protocol context configured to signal traffic and transmission of media stream data, setting up relevant resources comprising setting up packet classifier filters for a media stream to be transmitted via the communication connection in parallel to signaling filters for the signaling packet data of the initial packet data protocol context, and
   facilitating responding to the request for modification with an acknowledgement or with a set of communication connection parameters resulting from setting up the relevant resources.

2. The method according to claim 1, wherein checking the authorization of the modification causing an authorization to be requested from a policy decision function and/or a policy and charging rules function.

3. The method according to claim 1, wherein the relevant resources to be set up comprises at least one of a quality of service class of the packet data protocol context, filters to be used for the communication connection or bandwidth settings to be reserved for the communication connection.

4. The method according to claim 1, wherein responding to the request for modification comprises a transmission of information on quality of service parameters.

5. The method according to claim 1, wherein the initial packet data protocol context comprises a basic internet protocol connectivity or general purpose packet data protocol context.

6. The method according to claim 5, wherein causing receipt of a request for the modification of the initial packet data protocol context for the communication connection comprises causing receipt of a relevant internet protocol connectivity/packet data protocol context modification request to a user plane entity associated with the network control element.

7. The method according to claim 6, wherein setting up relevant resources for the modified packet data protocol context configured to signal traffic and the transmission of media stream data comprises:
   generating a filtered packet data protocol context by setting up signaling filters for the packet data protocol context;
   setting up packet classifier filters for a media stream to be transmitted via the communication connection;
   setting up a quality of service class of the packet data protocol context to a highest value required by any of the media streams and/or network elements using the packet data protocol context; and reserving traffic resources for the communication connection to an amount that the requirements of signaling traffic and media streams are fulfilled.

8. The method according to claim 7, wherein the traffic resources comprises a bandwidth for the communication connection.

9. The method according to claim 5, wherein causing receipt of a request for the modification of the initial packet data protocol context for the communication connection comprises causing receipt of a set of binding information in the modification request to the network control element.

10. The method according to claim 9, wherein setting up relevant resources for the modified packet data protocol context configured to signal traffic and the transmission of media stream data comprises:
  generating a filtered packet data protocol context by setting up signaling filters for the packet data protocol context;
  setting up packet classifier filters for a media stream to be transmitted via the communication connection;
  setting up a quality of service class of the packet data protocol context to a highest value required by any of the media streams and/or network elements using the packet data protocol context; and
  reserving traffic resources for the communication connection to an amount that the requirements of signaling traffic and media streams are fulfilled.

11. The method according to claim 1, wherein causing receipt of a request for a modification of the initial packet data protocol context for the communication connection comprises causing receipt of a set of binding information in the modification request to the network control element.

12. The method according to claim 11, wherein setting up relevant resources for a modified packet data protocol context usable to signal traffic and transmission of media stream data comprises:
  setting up packet classifier filters for a media stream to be transmitted via the communication connection in parallel to signaling filters for the initial signaling packet data protocol context;
  setting up a quality of service class of the packet data protocol context to a highest value required by any of the media streams and/or network elements comprising a user equipment and an internet protocol multimedia subsystem server involved in the communication connection using the packet data protocol context; and
  reserving traffic resources for the communication connection to an amount that the requirements of signaling traffic and media streams are fulfilled.

13. The method according to claim 1, wherein setting up relevant resources for the modified packet data protocol context usable to signal traffic and transmission of media stream data comprises:
  setting up packet classifier filters for a media stream to be transmitted via the communication connection in parallel to signaling filters for the initial signaling packet data protocol context;
  setting up a quality of service class of the packet data protocol context to a highest value required by any of the media streams and/or network elements comprising a user equipment and an interne protocol multimedia subsystem server involved in the communication connection using the packet data protocol context; and
  reserving traffic resources for the communication connection to an amount that the requirements of signaling traffic and media streams are fulfilled.

14. The method according to claim 1, wherein the network control element comprises a gateway general packet radio service support node.

15. The method according to claim 1, wherein the service providing network element is comprised in an internet protocol multimedia subsystem environment.

16. A system comprising:
  a user equipment;
  a network control element; and
  a service providing network element,
  wherein the user equipment is configured:
  to establish a communication connection with the service providing network element via the network control element based on an initial packet data protocol context, wherein the initial packet data protocol context comprises a signaling packet data protocol context; and
  wherein the network control element is configured:
  to receive a request for a modification of the initial packet data protocol context for the communication connection;
  to check whether or not the modification is authorized; and
  in an instance in which the modification is authorized,
  to set up relevant resources for a modified packet data protocol context configured to signal traffic and transmission of media stream data, the network control element being configured to set up relevant resources at least in part by setting up packet classifier filters for a media stream to be transmitted via the communication connection in parallel to signaling filters for the signaling packet data of the initial packet data protocol context, and
  to respond to the request for modification with an acknowledgement or with a set of communication connection parameters resulting from the set up of the relevant resources.

17. An apparatus comprising at least one processor and at least one memory storing computer program code, wherein the at least one memory and stored computer program code are configured to, with the at least one processor, cause the apparatus to at least:
  control an establishment of a communication connection with a policy control between a user equipment and a service providing network element based on an initial packet data protocol context, wherein the initial packet data protocol context comprises a signaling packet data protocol context;
  receive a request for a modification of the initial packet data protocol context for the communication connection from the user equipment;
  check whether or not the modification is authorized; and
  in an instance in which the modification is authorized, set up relevant resources for a modified packet data protocol context configured to signal traffic and transmission of media stream data, the set up of the relevant resources comprising setting up packet classifier filters for a media stream to be transmitted via the communication connection in parallel to signaling filters for the signaling packet data of the initial packet data protocol context, and to respond to the request for modification with an acknowledgement or with a set of communication connection parameters resulting from the set up of the relevant resources.

18. The apparatus according to claim 17, wherein the at least one memory and stored computer program code are configured to, with the at least one processor, cause the apparatus to check the authorization of the modification by causing an authorization to be requested from a policy decision function and/or policy and charging rules function.

19. The apparatus according to claim 17, wherein the relevant resources to be set up comprises at least one of a quality of service class of the packet data protocol context, filters to be used for the communication connection or bandwidth settings to be reserved for the communication connection.

20. The apparatus according to claim 17, wherein the at least one memory and stored computer program code are configured to, with the at least one processor, cause the apparatus to respond to the request for modification by causing a transmission of information on quality of service parameters.

21. The apparatus according to claim 17, wherein the initial packet data protocol context comprises a basic internet protocol connectivity or general purpose packet data protocol context.

22. The apparatus according to claim 21, wherein the apparatus is associated with a user plane entity, and wherein at least one memory and stored computer program code are configured to, with the at least one processor, cause the apparatus to receive a request for the modification of the initial packet data protocol context for the communication connection in a form of a relevant internet protocol connectivity/packet data protocol context modification request to the user plane entity.

23. The apparatus according to claim 22, wherein the user plane entity associated with the apparatus is configured to set up relevant resources for the modified packet data protocol context configured to signal traffic and the transmission of media stream data by:
    generating a filtered packet data protocol context by setting up signaling filters for the packet data protocol context;
    setting up packet classifier filters for a media stream to be transmitted via the communication connection;
    setting up a quality of service class of the packet data protocol context to a highest value required by any of the media streams and/or network elements using the packet data protocol context; and
    reserving traffic resources for the communication connection to an amount that the requirements quality of service traffic and media streams are fulfilled.

24. The apparatus according to claim 23, wherein the traffic resources comprises a bandwidth for the communication connection.

25. The apparatus according to claim 21, wherein the at least one memory and stored computer program code are configured to, with the at least one processor, cause the apparatus to receive a request for the modification of the initial packet data protocol context for the communication connection comprising a set of binding information in the modification request to the apparatus.

26. The apparatus according to claim 25, wherein the at least one memory and stored computer program code are configured to, with the at least one processor, cause the apparatus to set up relevant resources for the modified packet data protocol context configured to signal the traffic and the transmission of media stream data by:
    generating a filtered packet data protocol context by setting up signaling filters for the packet data protocol context;
    setting up packet classifier filters for a media stream to be transmitted via the communication connection;
    setting up a quality of service class of the packet data protocol context to a highest value required by any of the media streams and/or network elements using the packet data protocol context; and
    reserving traffic resources for the communication connection to an amount that the requirements quality of service traffic and media streams are fulfilled.

27. The apparatus according to claim 17, wherein the at least one memory and stored computer program code are configured to, with the at least one processor, cause the apparatus to receive a request for the modification of the initial packet data protocol context for the communication connection comprising a set of binding information in the modification request to the apparatus.

28. The apparatus according to claim 27, wherein the at least one memory and stored computer program code are configured to, with the at least one processor, cause the apparatus to set up relevant resources for a modified packet data protocol context usable to signal traffic and transmission of media stream data by:
    setting up packet classifier filters for a media stream to be transmitted via the communication connection in parallel to signaling filters for the initial signaling packet data protocol context;
    setting up a quality of service class of the packet data protocol context to a highest value required by any of the media streams and/or network elements using the packet data protocol context; and
    reserving traffic resources for the communication connection to an amount that the requirements of signaling traffic and media streams are fulfilled.

29. The apparatus according to claim 17, wherein the at least one memory and stored computer program code are configured to, with the at least one processor, cause the apparatus to set up relevant resources for the modified packet data protocol context configured to signal traffic and transmission of media stream data by:
    setting up packet classifier filters for a media stream to be transmitted via the communication connection in parallel to signaling filters for the initial signaling packet data protocol context;
    setting up a quality of service class of the packet data protocol context to a highest value required by any of the media streams and/or network elements using the packet data protocol context; and
    reserving traffic resources for the communication connection to an amount that the requirements of signaling traffic and media streams are fulfilled.

30. The apparatus according to claim 17, wherein the apparatus comprises a gateway general packet radio service support node.

31. The apparatus according to claim 17, wherein the service providing network element is comprised in an internet protocol multimedia subsystem environment.

32. An apparatus comprising at least one processor and at least one memory storing computer program code, wherein the at least one memory and stored computer program code are configured to, with the at least one processor, cause the apparatus to at least:
    cause establishment of a communication connection with a service providing network element via a network control element based on an initial packet data protocol context, wherein the initial packet data protocol context comprises a signaling packet data protocol context;
    cause a modification of the initial packet data protocol context to be requested for the communication connection at the network control element for a modified packet data protocol context configured to signal traffic and transmission of media stream data; and
    facilitate receipt, in response to the request for the modification, of an acknowledgement or a set of communication connection parameters for the modified packet data protocol context configured to signal the traffic and the transmission of the media stream data, the set of communication connection parameters resulting from a set up of relevant resources executed due to the request for the modification, the set up of relevant resources comprising set up of packet classifier filters for a media stream to be transmitted via the communication connection in parallel to signaling filters for the signaling packet data of the initial packet data protocol context.

33. The apparatus according to claim 32, wherein the relevant resources to be set up comprises at least one of a quality of service class of the packet data protocol context, filters to be used for the communication connection and bandwidth settings to be reserved for the communication connection.

34. The apparatus according to claim 32, wherein the at least one memory and stored computer program code are configured to, with the at least one processor, cause the apparatus to facilitate receipt of information on quality of service parameters as a response to the request for modification.

35. The apparatus according to claim 32, wherein the initial packet data protocol context comprises a basic internet protocol connectivity or general purpose packet data protocol context.

36. The apparatus according to claim 35, wherein the at least one memory and stored computer program code are configured to, with the at least one processor, cause the apparatus to cause the request for the modification of the initial packet data protocol context for the communication connection by causing a relevant internet protocol connectivity/ packet data protocol context modification request to be sent to a user plane entity associated with the network control element.

37. The apparatus according to claim 35, wherein the at least one memory and stored computer program code are configured to, with the at least one processor, cause the apparatus to cause the request for the modification of the initial packet data protocol context for the communication connection by causing a set of binding information to be sent in the modification request to the network control element.

38. The apparatus according to claim 32, wherein the at least one memory and stored computer program code are configured to, with the at least one processor, cause the apparatus to cause the request for the modification of the initial packet data protocol context for the communication connection by causing a set of binding information to be sent in the modification request to the network control element.

39. The apparatus according to claim 32, wherein the network control element comprises a gateway general packet radio service support node.

40. The apparatus according to claim 32, wherein the service providing network element is comprised in an internet protocol multimedia subsystem environment.

41. A non-transitory computer-readable memory encoded with instructions configured to control a processor to perform a process, the process comprising:
controlling an establishment of a communication connection with a policy control in a communication network between a user equipment and service providing network element based on an initial packet data protocol context, wherein the initial packet data protocol context comprises a signaling packet data protocol context;
causing receipt of a request for a modification of the initial packet data protocol context for the communication connection;
checking whether or not the modification is authorized; and
in an instance in which the modification is authorized,
setting up relevant resources for a modified packet data protocol context usable to signal traffic and transmission of media stream data, setting up relevant resources comprising setting up packet classifier filters for a media stream to be transmitted via the communication connection in parallel to signaling filters for the signaling packet data of the initial packet data protocol context, and
facilitating response to the request for modification with an acknowledgement or with a set of communication connection parameters resulting from setting up the relevant resources.

42. A method comprising:
causing establishment of a communication connection with a policy control in a communication network between a user equipment and service providing network
element via a network control element based on an initial packet data protocol context, wherein the initial packet data protocol context comprises a signaling packet data protocol context;
causing receipt of a pushed authorization for a modification of the initial packet data protocol context for the communication Connection at the network control element;
initializing the modification of the initial packet data protocol context for the communication connection at the network control element;
facilitating informing the user equipment about the modification by forwarding a request for modification of the initial packet data protocol context for the communication connection; and
setting up relevant resources for a modified packet data protocol context configured to signal traffic and transmission of media stream data, setting up relevant resources comprising setting up packet classifier filters for a media stream to be transmitted via the communication connection in parallel to signaling filters for the signaling packet data of the initial packet data protocol context.

43. The method according to claim 42, wherein the setting up relevant resources for the modified packet data protocol context configured to signal traffic and the transmission of media stream data comprises:
generating a filtered packet data protocol context by setting up signalling filters for the packet data protocol context;
setting up packet classifier filters for a media stream to be transmitted via the communication connection;
setting up a quality of service class of the packet data protocol context to a highest value required by any of the media streams and/or network elements using the packet data protocol context; and
reserving traffic resources for the communication connection to an amount that the requirements of signalling traffic and media streams are fulfilled.

44. An apparatus comprising at least one processor and at least one memory storing computer program code, wherein the at least one memory and stored computer program code are configured to, with the at least one processor, cause the apparatus to at least:
control an establishment of a communication connection with a policy control between a user equipment and a service providing network element based on an initial packet data protocol context, wherein the initial packet data protocol context comprises a signaling packet data protocol context;

cause receipt of a pushed authorization for a modification of the initial packet data protocol context for the communication connection at the apparatus;

initialize the modification of the initial packet data protocol context for the communication connection at the apparatus; and cause the user equipment to be informed about the modification by causing a request for modification of the initial packet data protocol context for the communication connection to be forwarded; and set up relevant resources for a modified packet data protocol context configured to signal traffic and transmission of media stream data, the set up of relevant resources comprising set up of packet classifier filters for a media stream to be transmitted via the communication connection in parallel to signaling filters for the signaling packet data of the initial packet data protocol context.

45. The apparatus according to claim 44, wherein the at least one memory and stored computer program code are configured to, with the at least one processor, cause the apparatus to set up relevant resources for the modified packet data protocol context configured to signal the traffic and the transmission of media stream data by:

generating a filtered packet data protocol context by setting up signalling filters for the packet data protocol context;

setting up packet classifier filters for a media stream to be transmitted via the communication connection;

setting up a quality of service class of the packet data protocol context to a highest value required by any of the media streams and/or network elements using the packet data protocol context; and reserving traffic resources for the communication connection to an amount that the requirements of signalling traffic and media streams are fulfilled.

46. A method, comprising:

causing establishment of a communication connection with a service providing network element via a network control element based on an initial packet data protocol context, wherein the initial packet data protocol context comprises a signaling packet data protocol context;

causing a request for a modification of the initial packet data protocol context for the communication connection at the network control element for a modified packet data protocol context configured to signal traffic and transmission of media stream data; and receiving, in response to the request for the modification, an acknowledgement or a set of communication connection parameters for the modified packet data protocol context configured to signal the traffic and the transmission of the media stream data, the set of communication connection parameters resulting from a set up of relevant resources executed due to the request for the modification, the set up of relevant resources comprising set up of packet classifier filters for a media stream to be transmitted via the communication connection in parallel to signaling filters for the signaling packet data of the initial packet data protocol context.

47. The method according to claim 46, wherein causing the request for the modification of the initial packet data protocol context for the communication connection comprises causing a set of binding information to be sent in the modification request to the network control element.

48. A non-transitory computer-readable memory encoded with instructions configured to control a processor to perform a process, the process comprising:

causing establishment of a communication connection with a service providing network element via a network control element based on an initial packet data protocol context, wherein the initial packet data protocol context comprises a signaling packet data protocol context;

causing a modification of the initial packet data protocol context to be requested for the communication connection at the network control element for a modified packet data protocol context configured to signal traffic and transmission of media stream data; and causing receipt, in response to the request for the modification, of an acknowledgement or a set of communication connection parameters for the modified packet data protocol context configured to signal the traffic and the transmission of the media stream data, the set of communication connection parameters resulting from a set up of relevant resources executed due to the request for the modification, the set up of relevant resources comprising set up of packet classifier filters for a media stream to be transmitted via the communication connection in parallel to signaling filters for the signaling packet data of the initial packet data protocol context.

49. A non-transitory computer-readable memory encoded with instructions configured to control a processor to perform a process, the process comprising:

causing establishment of a communication connection with a policy control in a communication network between a user equipment and service providing network element via a network control element based on an initial packet data protocol context, wherein the initial packet data protocol context comprises a signaling packet data protocol context;

causing receipt of a pushed authorization for a modification of the initial packet data protocol context for the communication connection at the network control element;

initializing the modification of the initial packet data protocol context for the communication connection at the network control element;

informing the user equipment about the modification by causing forwarding of a request for modification of the initial packet data protocol context for the communication connection; and setting up relevant resources for a modified packet data protocol context configured to signal traffic and transmission of media stream data, setting up relevant resources comprising setting up packet classifier filters for a media stream to be transmitted via the communication connection in parallel to signaling filters for the signaling packet data of the initial packet data protocol context.

* * * * *